July 18, 1944.  R. B. HANSEN  2,354,118
PENCIL HOLDER
Filed Nov. 20, 1943
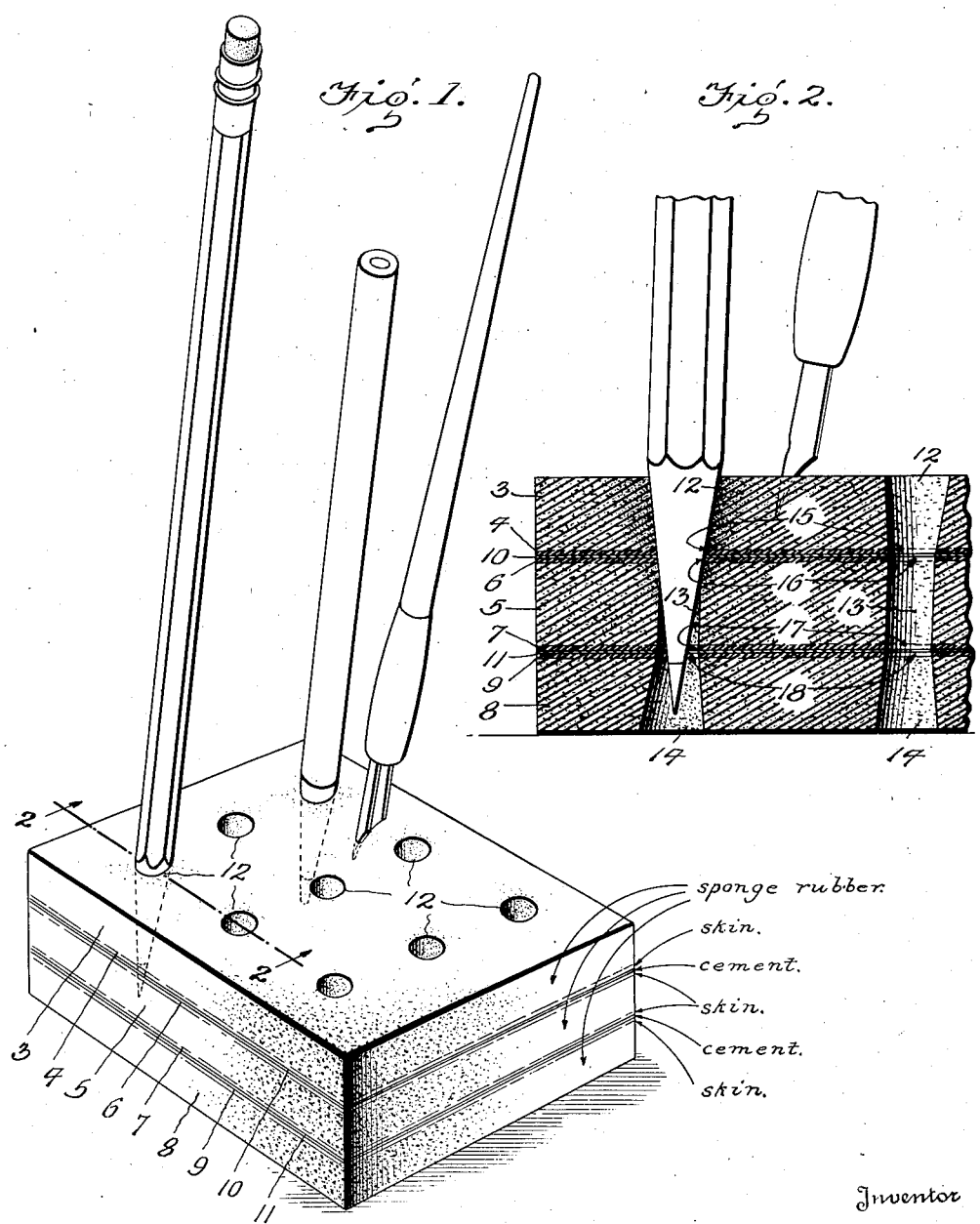
Inventor
R. B. Hansen.
By
H. B. Willson & Co. Attorney Patented July 18, 1944

2,354,118

UNITED STATES PATENT OFFICE 2,354,118

PENCIL HOLDER

Richard B. Hansen, Akron, Ohio

Application November 20, 1943, Serial No. 511,124

3 Claims. (Cl. 120—1)

The invention aims to provide an unusually simple, inexpensive and advantageous device for accessibly holding one or more lead pencils upon a desk, or elsewhere, in such manner that each pencil will have its point well protected.

A further object is to provide a device which will tenaciously hold the pencils even if said device be used on an aircraft, a motor vehicle, or other carrier in which a great deal of vibration is present.

With the foregoing in view, the invention resides in the novel subject matter hereinafter described and claimed, description being accomplished by reference to the accompanying drawing.

Figure 1 is a perspective view showing the device in use.

Figure 2 is an enlarged vertical sectional view on line 2—2 of Fig. 1.

A construction has been disclosed which has proven to be of manufacturing advantage, as well as advantageous from the standpoint of use. This construction will be specifically described, with the understanding, however, that within the scope of the invention as claimed, minor variations may be made.

In the drawing above briefly described, the numeral 3 denotes a slab of sponge rubber having an integral relatively stiff skin 4 on its lower side; 5 denotes a second slab of sponge rubber under the slab 3 and having a relatively stiff integral skin 6 on its upper side and a corresponding skin 7 on its lower side; and 8 denotes a third sponge rubber slab under the slab 5 and having an integral relatively stiff skin 9 on its upper side. The skins 4 and 6 are secured together by a layer of rubber cement 10, and a corresponding cement layer 11 secures the skins 7 and 9 together. There is thus formed a resilient block consisting primarily of sponge rubber slabs with a relatively stiff rubber web between each two adjacent slabs, each web serving to effectively stiffen the device as well as aiding in holding the pencils in place.

The three slabs 3, 5 and 8 are formed with alined openings 12, 13 and 14 respectively, and the skins 4, 6, 7, and 9 are formed with openings 15, 16, 17 and 18 respectively which are alined with said openings 12, 13 and 14. The openings 12 are downwardly tapered, the openings 14 are upwardly tapered, and the communicating openings 15, 16, 17 and 18 are of the same diameter as the small ends of said openings 12 and 14. The openings 13 are also preferably of this same diameter.

When the pointed end of a pencil is placed in any of the openings but is not pressed downwardly to some extent, it lightly engages only the upper slab 3 but if said pencil be forced downwardly with some pressure, it will wedge not only in the opening 12 but in the openings in the skins 4 and 6, and somewhat into the upper end of the opening 13. It will thus be seen that any pencil may be held with desired firmness, according to the environment in which the device is used. On a desk, for instance, it will usually of course suffice to merely have the pencils held lightly but if the device should be used on any kind of a land vehicle, an aircraft or the like, it will usually be necessary to hold the pencils more firmly, it being only necessary to force them more tightly into place to attain this end. Then, they will be tenaciously held, even though the device be mounted upon a vertical support with the pencils projecting horizontally, or even mounted on an overhead support with the pencils projecting downwardly.

In addition to using the device for pencil holding, it may also be advantageously employed as a holder for pens. The points of the pens are simply forced into the sponge rubber of the slab 6 and are thus conveniently held and their points kept clean in readiness for use. For illustrative purposes, the drawing shows the device in use for holding one pen and two pencils, but it will be understood that any or all of the openings may be occupied with pencils and the intervening spaces with one or more pens. While the device is preferably of the construction shown in order that either the slab 3 or the slab 8 may be used uppermost, this is of course not absolutely essential. Moreover, while I disclose a rectangular configuration for the device, its shape may of course be varied as desired and obviously it may be made with any desired number of pencil-receiving openings.

From standpoints of manufacture and use, the exact construction disclosed is preferred, but the invention is not restricted thereto.

I claim:

1. A pencil holder including an upper sponge rubber slab, a second sponge rubber slab under said upper slab, and a relatively stiff rubber web between and unitarily united with said sponge rubber slabs, said sponge rubber slabs and said relatively stiff rubber web having alined openings into which to wedge the pointed end of a pencil.

2. A pencil holder including an upper sponge rubber slab having an integral relatively stiff rubber skin on its lower side, and a second sponge rubber slab under said upper slab and having an integral relatively stiff rubber skin on its upper side, said skins of the two slabs being cemented together, said slabs and skins having alined openings into which to wedge the pointed end of a pencil.

3. A pencil holder including an upper sponge rubber slab having an integral relatively stiff rubber skin on its lower side, a second sponge rubber slab under said upper slab and having an integral relatively stiff rubber skin on its upper side, said skins of the two slabs being cemented together, said second slab also having an integral relatively stiff rubber skin on its lower side, and a third sponge rubber slab under said second slab and having an integral relatively stiff rubber skin on its upper side, the skin of said third slab and the skin on the lower side of said second slab being cemented together, all of said slabs and their skins having alined openings into which to wedge the pointed end of a pencil, and the openings in the upper and third slabs being tapered from the outer faces of said slabs toward their skins.

RICHARD B. HANSEN.